United States Patent [19]
Matsumoto et al.

[11] Patent Number: 5,701,983
[45] Date of Patent: Dec. 30, 1997

[54] CLUTCH DEVICE

[75] Inventors: Shogo Matsumoto; Kiyohito Murata, both of Susono, Japan

[73] Assignee: Toyota Jidosha Kabushiki Kaisha, Toyota, Japan

[21] Appl. No.: 600,027

[22] Filed: Feb. 12, 1996

[30] Foreign Application Priority Data

Feb. 21, 1995 [JP] Japan ................... 7-032540

[51] Int. Cl.⁶ .................................................. F16D 43/20
[52] U.S. Cl. ...................... 192/35; 192/54.52; 192/93 A; 475/275
[58] Field of Search ................... 192/35, 93 A, 192/84.7, 109 R, 54.5, 54.52; 475/275

[56] References Cited

U.S. PATENT DOCUMENTS

| | | | |
|---|---|---|---|
| 1,974,390 | 9/1934 | Eason | 192/35 |
| 2,057,742 | 10/1936 | Russell . | |
| 2,827,994 | 3/1958 | Tiedeman et al. . | |
| 2,887,200 | 5/1959 | Mergen et al. | 192/35 |
| 3,000,479 | 9/1961 | Mosbacher | 192/35 |
| 3,199,374 | 8/1965 | O'Malley et al. . | |
| 3,404,585 | 10/1968 | Roper | 192/35 X |
| 3,674,118 | 7/1972 | Klaue . | |
| 3,688,882 | 9/1972 | O'Malley . | |
| 3,717,229 | 2/1973 | Perlick . | |
| 3,733,920 | 5/1973 | Annis . | |
| 5,031,746 | 7/1991 | Koivunen . | |
| 5,036,963 | 8/1991 | Murata . | |
| 5,070,975 | 12/1991 | Tanaka et al. . | |
| 5,106,348 | 4/1992 | Koivunen . | |
| 5,464,084 | 11/1995 | Aoki et al. . | |
| 5,593,016 | 1/1997 | Murata et al. | 192/54.52 |
| 5,603,396 | 2/1997 | Murata et al. | 192/54.52 |

FOREIGN PATENT DOCUMENTS

| | | |
|---|---|---|
| 0 478 917 | 4/1992 | European Pat. Off. . |
| 2 078 382 | 11/1971 | France . |
| 25 40 489 | 12/1976 | Germany . |
| 40 38 731 | 6/1992 | Germany . |
| 2-66328 | 3/1990 | Japan . |
| 2-69134 | 5/1990 | Japan . |
| 2 060 339 | 5/1938 | United Kingdom . |
| 1149573 | 4/1969 | United Kingdom . |
| 2 251 465 | 7/1992 | United Kingdom . |

OTHER PUBLICATIONS

Erkki A. Koivunen, et al. "The Multi–Mode Clutch—A New Technology for Freewheeler Shifting Automatic Transmissions", *SAE Paper*, 1993, pp. 181–194.

*Primary Examiner*—Andrea L. Pitts
*Attorney, Agent, or Firm*—Oblon, Spivak, McClelland, Maier & Neustadt, P.C.

[57] ABSTRACT

A clutch device with a cam mechanism is provided, which is free from drag loss when the phase is switched from a state wherein the cam mechanism is operative to a state wherein it is inoperative. A cam groove 1c and a recess 1d are formed on the inner surface 1a of a piston, and a cam groove 3c and a projection 3d to be inserted into the recess 1d are formed on the inner surface 3a of a pressure plate 3. Between the cam grooves 1c and the 3c is interposed a cam roller 2 loosely retained by a roller cage 4. When the hydraulic pressure is applied to the back surface 1b of the piston 1 while a $C_3$ clutch disk 5 rotates faster than the piston 1, the cam mechanism is operative to carry out the engagement operation. On the contrary, when the application of the hydraulic pressure is interrupted while the $C_3$ clutch disk 5 rotates slower than the piston 1, the engagement is released. Meanwhile, the riding of the cam roller 2 over the cam elements is avoidable by the recess 1d and the projection 3d.

12 Claims, 12 Drawing Sheets

| RANGE | GEAR | $C_1$ | $C_2$ | $C_3$ | $B_1$ | $B_2$ | $B_3$ | $B_4$ | $F_1$ | $F_2$ |
|---|---|---|---|---|---|---|---|---|---|---|
| P | (PARKING) |  |  | ON |  |  |  |  |  |  |
| R | (REVERSE) |  | ON | ON |  |  | ON |  |  |  |
| N | (NEUTRAL) |  |  | ON |  |  |  |  |  |  |
| D | O/D | ON | ON |  |  | ON |  | ON |  |  |
| D | THIRD | ON | ON | ON |  | ON |  |  |  |  |
| D | SECOND | ON |  | ON |  | ON |  |  | ON |  |
| D | FIRST | ON |  | ON |  |  |  |  |  | ON |
| 2 | SECOND | ON |  | ON | ON | ON |  |  | ON |  |
| 2 | FIRST | ON |  | ON |  |  |  |  |  | ON |
| L | FIRST | ON |  | ON |  |  | ON |  |  | ON |

A POINT OF ACTION

A POINT OF ACTION

A POINT OF ACTION

A POINT OF ACTION

A POINT OF ACTION

CLUTCH DEVICE

BACKGROUND OF THE INVENTION

1. Field of the Invention

The present invention relates to a clutch device used in an automatic transmission for an automobile.

2. Description of the Related Art

In clutch devices disclosed in Japanese Patent Application Nos. 6-48806 and 6-69632 (corresponding to Unexamined Patent Publication (Kokai) Nos. 7-259885 and 7-279992) filed in the name of the assignee of the present application, a cam mechanism is provided between two members rotating relatively to each other so that a force generated due to the relative rotation of the members and acting in the circumferential direction is converted to a thrust acting in the axial direction which is used as a clutch-engagement force.

According to the above clutch devices, it is possible to miniaturize the clutch device as a whole by a reduction in the number of clutch disks due to the utilization of a booster function and a mono-directional action of the cam mechanism and by the elimination of a one-way clutch.

In the above clutch devices, a cam roller is arranged between a pair of cam members, each having a cam surface opposing to each other, and generates an axial thrust by the enlargement of a distance between the cam surfaces caused by the climbing of the cam roller on the cam surfaces due to the relative rotation of the cam members. Thus, the clutch disk is pushed by this thrust.

If the cam mechanism is adapted to be operable only when the cam members rotate in one predetermined direction, the respective cam surface is formed to have a slope suitable therefor, and one end of the cam surface is formed to be a limiter surface for limiting the displacement of the cam roller.

However, in the above devices even though the limiter surface is formed at one end of the cam surface as described above, there is a problem when the phase is switched, due to the reverse of the direction of the relative rotation, from the engaging state wherein the cam mechanism is operative to the releasing state wherein it is inoperative, in that the cam roller may ride on the edge of the limiter surface and results in a drag loss.

SUMMARY OF THE INVENTION

An object of the present invention is to solve the above drawback of the related art devices and to provide a clutch device with a cam mechanism free from drag loss upon the switching of the phase from the engaging state wherein the cam mechanism is operative to the releasing state wherein it is inoperative.

The above object is achievable by a clutch device, according to the present invention, which comprises a pair of members disposed at a distance on a common axis and being relatively rotatable to each other on the common axis, a cam mechanism disposed between the pair of members, the cam mechanism comprising a pair of cam elements, each having a cam surface axially opposed to each other, and a cam roller disposed between the opposed cam surfaces, a pushing means for selectively pushing the cam mechanism as a whole onto the axially opposed surface of one of the relatively rotating members to convert a circumferential force to an axial thrust via the cam mechanism so that the relatively rotating members are integrally engaged with each other by the thrust, and a limiter means for limiting the relative rotational movement of the cam elements when the relative rotation occurs between the members in the direction reverse to that wherein the axial thrust is generated between the pair of members.

The present invention will be described in more detail below with reference to the preferred embodiments illustrated in the attached drawings.

BRIEF DESCRIPTION OF THE DRAWINGS

In the drawings:

FIG. 3 is a side sectional view of an automatic transmission to which one embodiment of the present invention is built-in;

DESCRIPTION OF THE PREFERRED EMBODIMENTS

Figure 1:
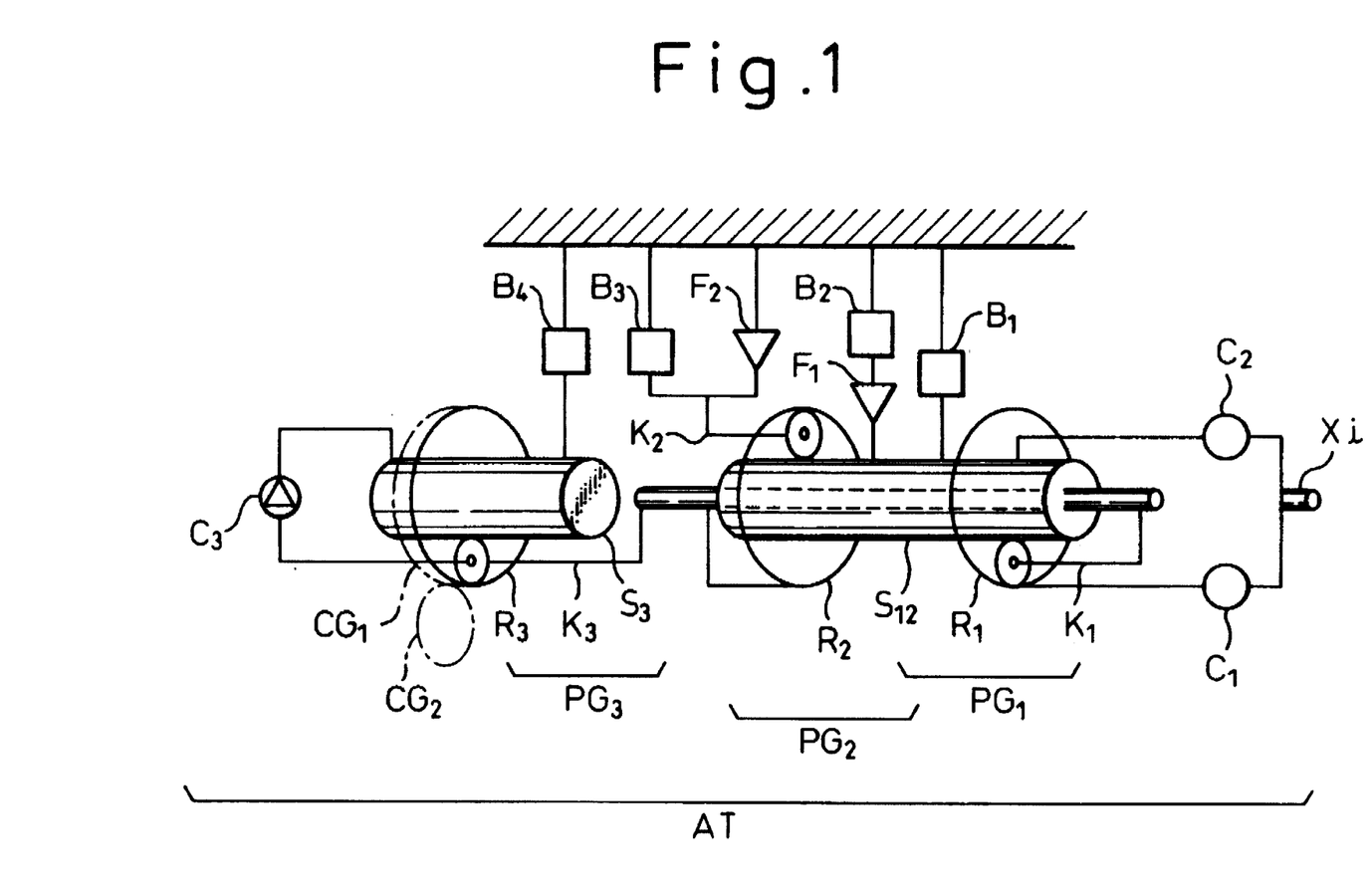
FIG. 1 is a schematic view illustrating an overall structure of an automatic transmission to which the present invention is applied.

FIG. 1 schematically illustrates an overall structure of an automatic transmission for the purpose of explaining where an embodiment of the present invention is used in the automatic transmission.

In the figure, AT generally represents an automatic transmission which basically comprises three sets of planetary gear units and plural frictional engagement devices for engaging and disengaging ring gears, sun gears, carriers composing the planetary gear units to and from each other, the details thereof being as follows:

$X_1$ represents an input shaft which is connected to an output shaft (not shown) of a torque converter (not shown);

$PG_1$, $PG_2$ and $PG_3$ represent a front planetary gear unit, a rear planetary gear unit and an O/D planetary gear unit, respectively;

$R_1$, $R_2$ and $R_3$ represent a front planetary ring gear, a rear planetary ring gear and an O/D planetary ring gear, respectively;

$K_1$, $K_2$ and $K_3$ represent a front planetary carrier, a rear planetary carrier and an O/D planetary carrier, respectively;

$S_{12}$ represents a front and rear planetary sun gear common to the front and rear planetary gear units, and $S_3$ represents an O/D planetary sun gear;

$C_1$ represents a first clutch for engaging/disengaging the input shaft $X_1$ to and from the front planetary ring gear $R_1$;

$C_2$ represents a second clutch for engaging and disengaging the input shaft $X_1$ to and from the front and rear planetary sun gear $S_{12}$;

$C_3$ represents a third clutch for engaging and disengaging the O/D planetary carrier $K_3$ to and from the O/D planetary sun gear $S_3$, including a one-way clutch mechanism for releasing the engagement between the O/D planetary carrier $K_3$ and the O/D planetary sun gear $S_3$ when a fourth brake $B_4$ described later is operated;

$B_1$ represents a first brake for locking the front and rear planetary sun gear $S_{12}$;

$B_2$ represents a second brake for locking the reverse rotation (counterclockwise rotation) of the front and rear planetary sun gear $S_{12}$;

$B_3$ represents a third brake for locking the rear planetary carrier $K_2$;

$B_4$ represents a fourth brake for locking the O/D planetary sun gear $S_3$;

$F_1$ represents a first one-way clutch for locking the reverse rotation (counterclockwise rotation) of the front and rear planetary sun gear $S_{12}$ when the second brake $B_2$ is operated; and $F_2$ represents a second one-way clutch for locking the reverse rotation (counterclockwise rotation) of the rear planetary carrier $K_2$.

$CG_1$ and $CG_2$ represent a counter drive gear and a counter driven gear, respectively, which transmit the engine torque to a post-stage mechanism but have no relation to speed changing.

Figure 2:
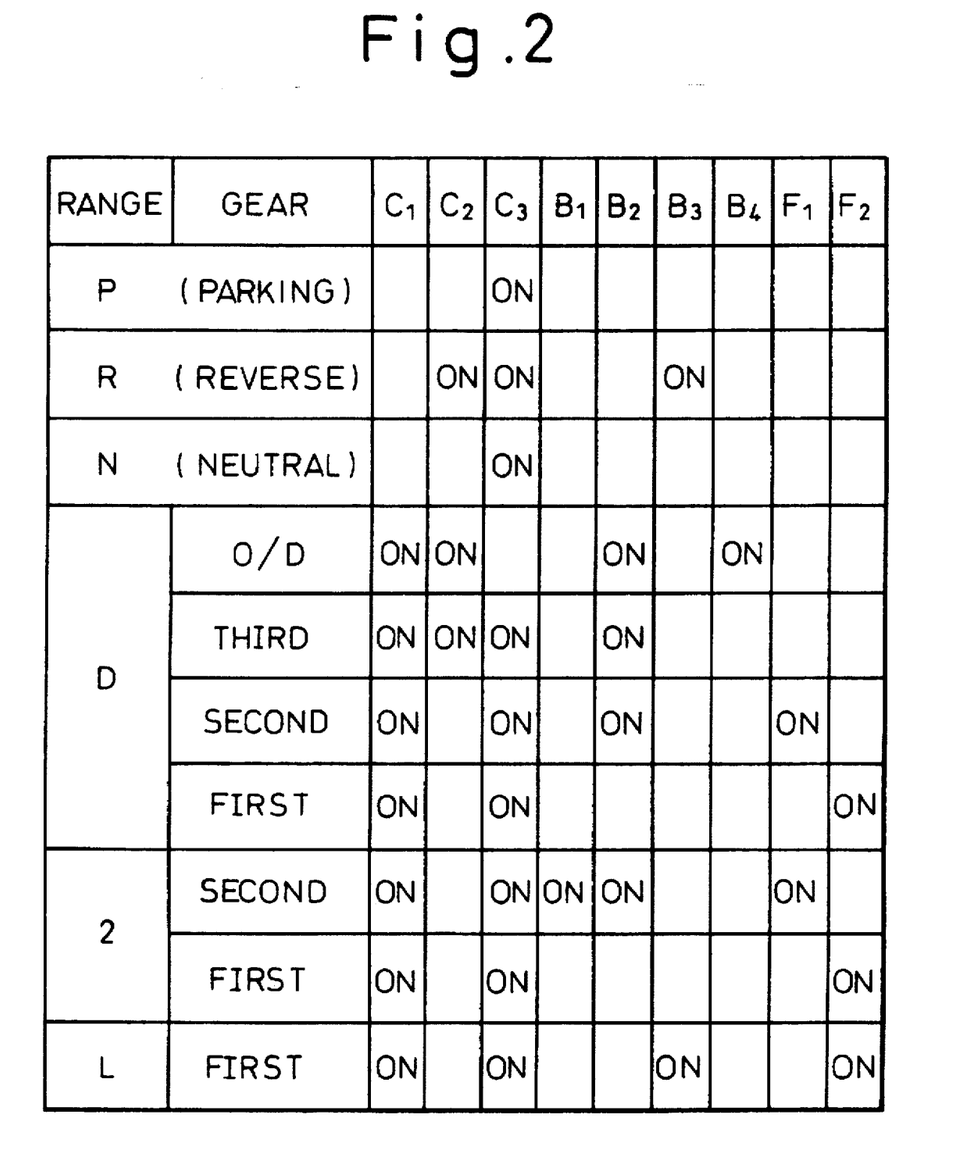
FIG. 2 is a table for obtaining various driving speeds.

The table shown in FIG. 2 shows a combination of the engagement and disengagement of frictional engagement elements to attain desired speeds at each range and gear speed.

Accordingly, it is necessary to engage the O/D planetary carrier $K_3$ with the O/D planetary sun gear $S_3$ in all forward speed ranges except for the fourth speed; to release the engagement simultaneously with the actuation of the fourth brake $B_4$ in the up-shift from the third speed to the fourth speed; and to release the fourth brake $B_4$ simultaneously with the above engagement in the down-shift from the fourth speed to the third speed. While the rotational direction of the O/D planetary carrier $K_3$ in the reverse speed is opposite to those in the forward speeds, it is necessary, even in this case, to engage the O/D planetary carrier $K_3$ with the O/D planetary sun gear $S_3$.

In the engine-brake state wherein the O/D planetary sun gear $S_3$ is an input side, the above engagement is necessary in all the speed ranges including the reverse range, except for first and second speeds in the D-range.

The embodiments described below are those having a function similar to that of the third clutch $C_3$ of the automatic transmission shown in FIG. 1.

Figure 3:
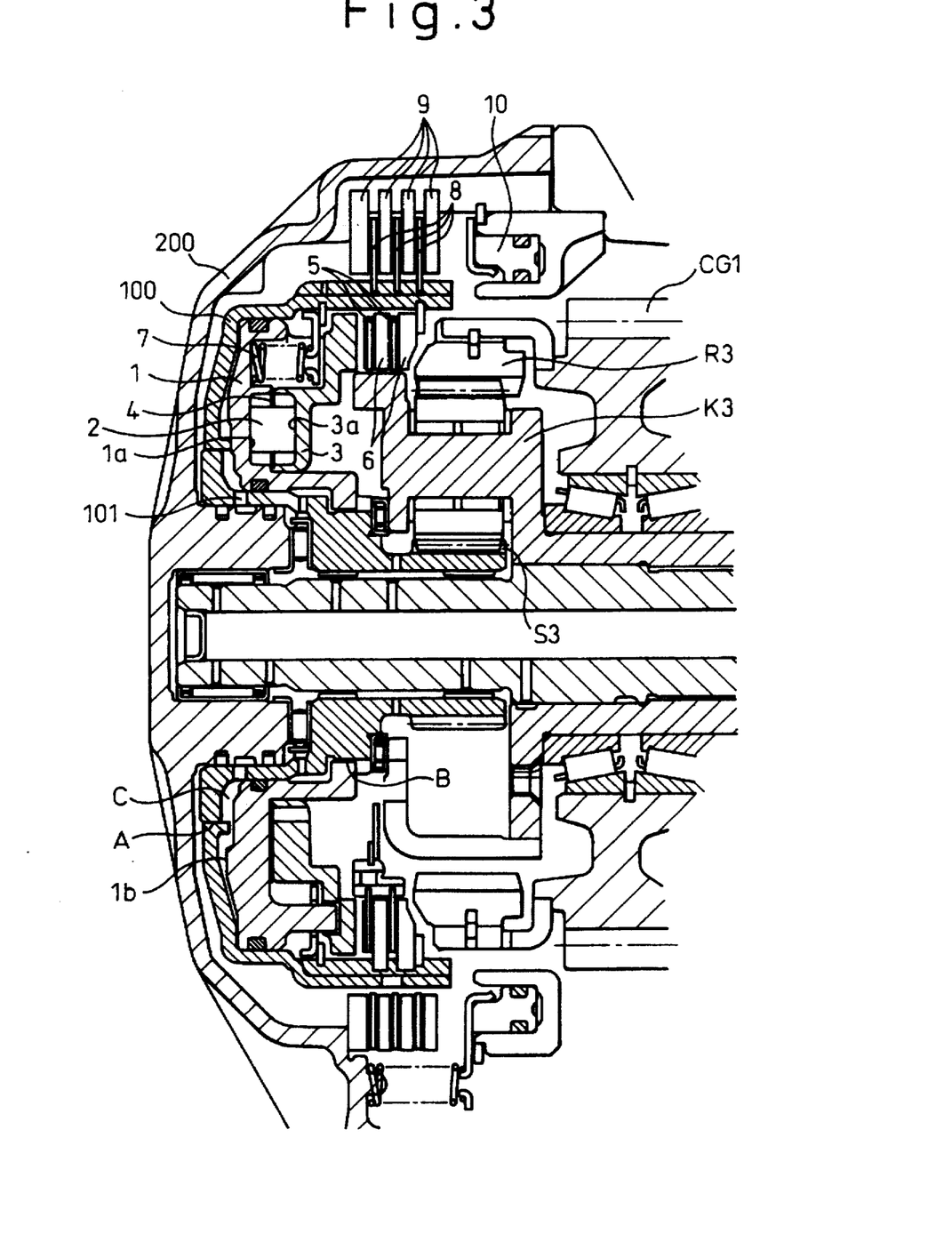

FIG. 3 illustrates a side sectional view of an automatic transmission to which a first embodiment of the present invention is built-in, wherein reference numeral 1 represents a piston; 2 represents a cam roller; and 3 represents a pressure plate. On inner surfaces 1a, 3a of the piston 1 and the pressure plate 3, respectively, cam grooves 1c and 3c are formed opposing to each other at several locations in the circumferential direction, so that a cam roller 2 is accommodated in the respective pair of opposed cam grooves. The cam roller 2 is rotatably retained by a roller cage 4.

A clutch casing 100 consists of outer and inner halves welded to each other at part A to form an integral body, and coupled to the O/D planetary sun gear $S_3$ while being rotatable relative to a housing 200.

The piston 1 is spline-coupled to the clutch casing 100 at part B and is movable to the right and left in the figure in an annular cylinder formed in the interior of the clutch casing 100. A hydraulic pressure is supplied into space C between a back surface 1b of the piston 1 and the clutch casing 100 via an oil path 101.

Clutch disks 5 of the clutch $C_3$ which are spline-coupled to the O/D planetary carrier $K_3$ are selectively engaged frictionally with separator plates 6 of the clutch $C_3$ which are spline-coupled to the clutch casing 100 with the piston 1 through the pressure plate 3.

A spring 7 is fixedly secured, at the right end thereof, to the clutch casing 100 to always bias the piston 1 to the left in the figure.

Clutch disks 8 of the brake $B_4$ which are spline-coupled to the clutch casing 100 are selectively engaged frictionally with separator plates 9 of the brake $B_4$ which are spline-coupled to the housing 200 with a piston 10 of the brake $B_4$.

The structure and operation of the first embodiment will be described with reference to FIGS. 4A to 4C which are cross-sectional views of a cam section as seen parallel to the rotation axis.

Figure 4A:
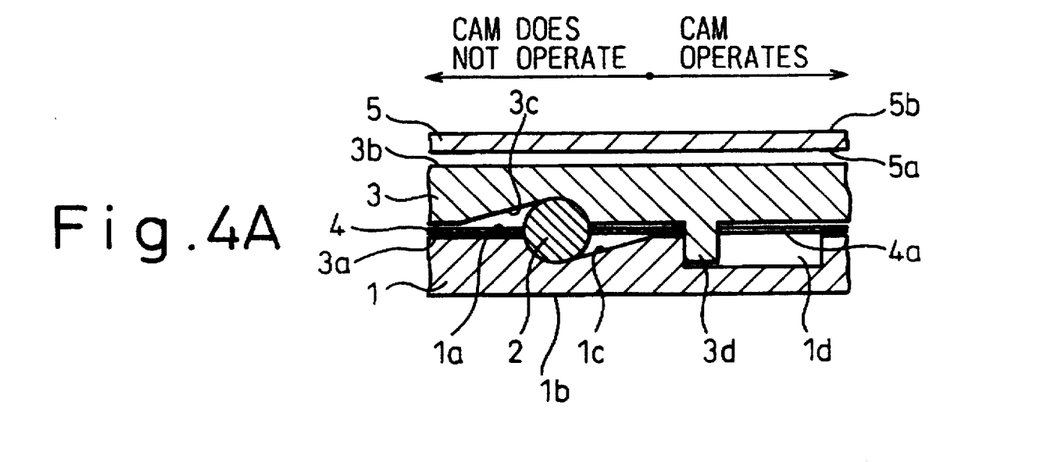
FIG. 4A to 4C are views for illustrating a structure and operation of the first embodiment.

In FIG. 4A, reference numerals 1, 2, 3, 4 and 5 represent the piston, cam roller, pressure plate, roller cage and clutch disk of the clutch $C_3$ shown in FIG. 3, respectively.

On the inner surface 1a of the piston 1 a cam groove 1c and a recess 1d which serves as the limiter according to the present invention are provided. On the other hand, on the inner surface 3a of the pressure plate 3 a cam groove 3c and a projection 3d projected into the recess 1d of the piston 1 through an opening 4a formed in the roller cage 4 are provided.

FIG. 4A illustrates a disengaging state wherein the pressure plate 3 and the $C_3$ clutch disk 5 are apart from each other. In this state, the $C_3$ clutch disk 5 splined-coupled to the O/D planetary carrier $K_3$ moves to the right in the figure, while the piston 1 and the pressure plate 3 are stationary.

When a hydraulic pressure P is applied to the back surface 1b of the piston 1, the piston 1 and the pressure plate 3 moves toward the $C_3$ clutch disk 5 together with the roller 2 nipped therebetween, and the back surface 3b of the pressure plate 3 is engaged with a first surface 5a of the clutch disk 5 whereby the pressure plate 3 is dragged to the right in the figure by the clutch disk 5.

Then, the cam groove 3c of the pressure plate 3 rides on the roller 2 which in turn rides on the cam groove 1c of the piston 1, causing the distance between the inner surface 1a of the piston 1 and that 3a of the pressure plate 3 to increase, whereby the back surface 1b of the piston 1 moves downward in the figure and finally stops by abutting on the casing (not shown), while the $C_3$ clutch disk 5 moves upward in the figure.

Since a separator plate of the third clutch $C_3$ (not shown) rotating together with the piston 1 is disposed facing the $C_3$ clutch disk 5, the $C_3$ clutch disk 5 is engaged with this separator plate.

Since the $C_3$ clutch disk 5 is coupled to the O/D planetary carrier $K_3$ and the piston 1 is to the O/D planetary sun gear $S_3$, the O/D planetary sun gear $S_3$ is integral with the O/D planetary carrier $K_3$ to be rotatable together according to this engagement.

Figure 4B:
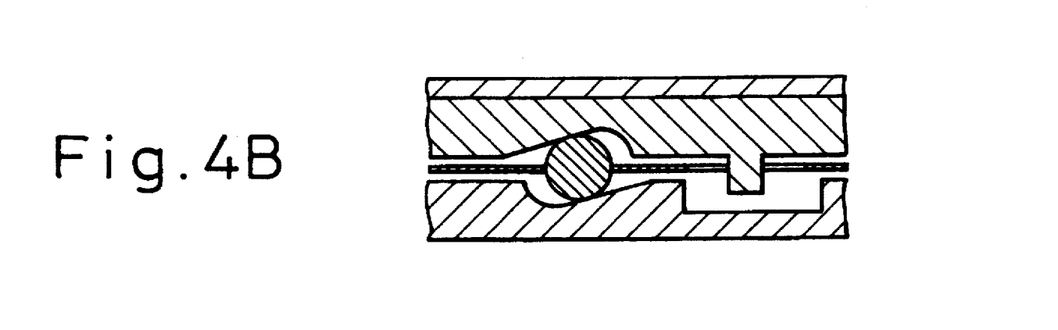
Figure 4C:
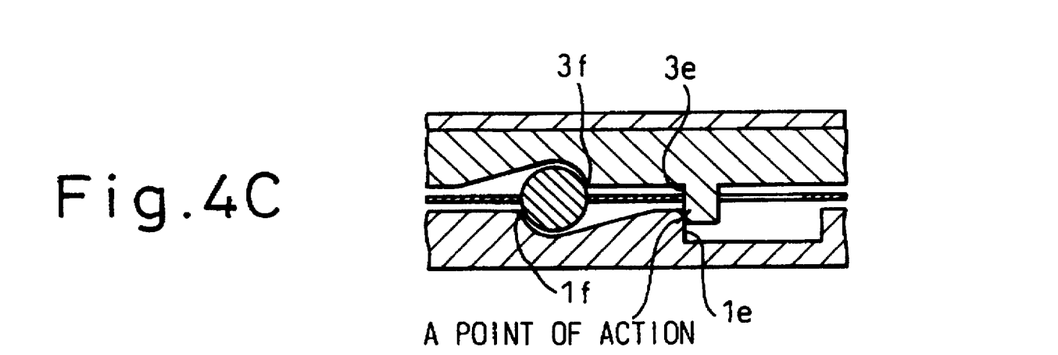

FIG. 4B illustrates, the piston 1 and the $C_3$ clutch disk 5 engaged to each other as described. In this regard, since the opening 4a of the roller cage 4 is formed to be sufficiently large, no interference occurs between the projection 3d of the pressure plate 3 and the roller cage 4 when the phase is switched from the state shown in FIG. 4A to that shown in FIG. 4B.

FIG. 4B shows the driving state wherein the engine positively drives the wheels in all of the forward gear speeds except for the fourth gear speed. If the application of the hydraulic pressure P is maintained on the back surface 1b of the piston 1, even when the driving state changes to the non-driving state wherein the engine is passively rotated by the wheels and the O/D planetary sun gear $S_3$ leads the relative rotation, the engine-brake is effective because the engagement between the O/D planetary carrier $K_3$ and the O/D planetary sun gear $S_3$ is maintained although there is no booster function of the cam mechanism.

In this regard, in the first and second gear speeds of D range, the second and first one-way clutches $F_2$, $F_1$ are idling, respectively, to nullify the engine brake.

When up-shifting from the third gear speed to the fourth gear speed, it is necessary to release the engagement between the O/D planetary carrier $K_3$ and the O/D planetary sun gear $S_3$ to maintain the rotation of the O/D planetary carrier $K_3$ while interrupting the rotation of the O/D planetary sun gear $S_3$.

For this purpose, the fourth brake $B_4$ is actuated to interrupt the rotation of the O/D planetary sun gear $S_3$. Since the O/D planetary carrier $K_3$ is coupled to the O/D planetary ring gear $R_3$, the rotational speed of the O/D planetary carrier $K_3$ temporarily becomes slower.

Accordingly, the $C_3$ clutch disk 5 coupled to the O/D planetary carrier $K_3$ rotates slower, relative to the piston 1 coupled to the O/D planetary sun gear $S_3$, and thus a state is attained wherein the relative rotation is opposite to that in the state shown in FIG. 4B.

As a result, the pressure plate 3 engaged with the $C_3$ clutch disk 5 escapes from the roller 2 in the lefthand direction in the figure, while maintaining the inner surface 1a of the piston 1 apart from the inner surface 3a of the pressure plate 3. Also the piston 1 escapes from the roller 2 in the righthand direction.

Thus, a wall surface 1e of the recess 1d of the piston 1 approaches a wall surface 3e of the projection 3d of the pressure plate 3.

In this regard, the recess 1d of the piston 1 and the projection 3d of the pressure plate 3 are designed to abut each other before an edge if of the inner surface 1a of the piston 1 and an edge 3f of the cam groove 3c come into contact with the roller 2, respectively. Therefore, as shown in FIG. 4C, the roller 2 is prevented from riding on the edge if of the inner surface 1a of the piston 1 and the edge 3f of the cam groove 3c of the pressure plate 3 whereby the wall surface 1e of the recess 1d of the piston 1 and the wall surface 3e of the projection 3d of the pressure plate 3 abut onto each other to inhibit the further relative movement between the piston 1 and the pressure plate 3.

A location indicated by X in the figure defines a point of action on which a force is applied for limiting the relative movement between the piston 1 and the pressure plate 3.

Supply of the hydraulic pressure to the back surface 1b of the piston 1 is interrupted, when the fourth brake $B_4$ is actuated, and thus a force pushing the pressure plate 3 onto the clutch disk 5 disappears to causes the pressure plate 3 to move away from the $C_3$ clutch disk 5. Thereby, the engagement is released and the O/D planetary carrier $K_3$ continues to rotate but the O/D planetary sun gear $S_3$ is stationary, resulting in the fourth gear speed.

The shift from the fourth gear speed to the third gear speed corresponds to the change from the state shown in FIG. 4A to that shown in FIG. 4B. This is done by releasing the fourth brake $B_4$ and simultaneously therewith initiating the supply of hydraulic pressure to the back surface 1b of the piston 1.

As stated above, according to the first embodiment, since the riding of the roller on the edge 1f of the inner surface 1a of the piston 1 and on the edge 3f of the cam groove 3a of the pressure plate 3 is eliminated, the generation of undesirable thrust can be reliably avoided when the switching operation is carried out from a state wherein the relative rotation is caused by the operation of the cam mechanism and that wherein the relative rotation is caused without the intervention of the cam mechanism.

In the non-driving state in the fourth gear speed, since the O/D planetary ring gear $R_3$ is on the input side and the O/D planetary carrier $K_3$ is on the output side via the stationary O/D planetary sun gear $S_3$, the engine brake is effective.

Next, the second to ninth embodiments will be described in the same manner as the first embodiment described with reference to FIGS. 4A, 4B and 4C.

Figure 5A:
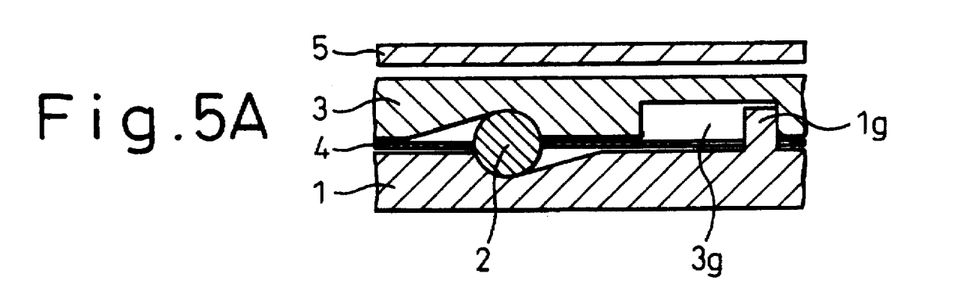
FIG. 5A to 5C are views for illustrating a structure and operation of the second embodiment.
Figure 5B:
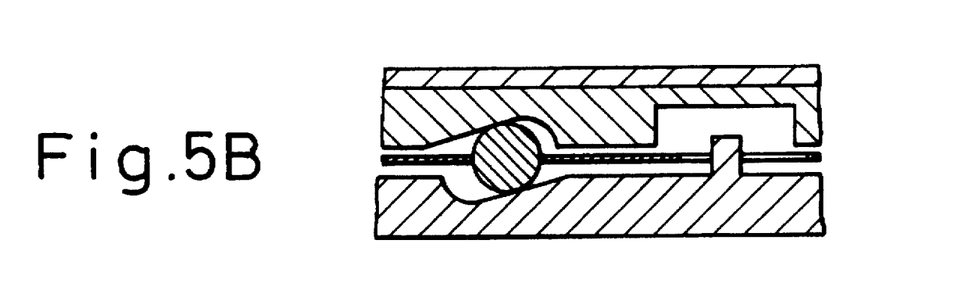
Figure 5C:
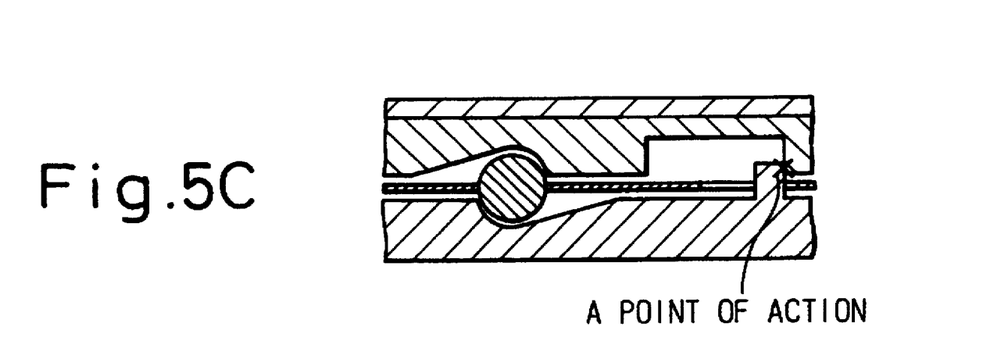

The second embodiment shown in FIGS. 5A to 5C is substantially identical to the first embodiment except that a recess 3g is provided in the pressure plate 3 and a projection 1g is provided in the piston 1. A description of the operation is not given because it is the same as the first embodiment.

Figure 6A:
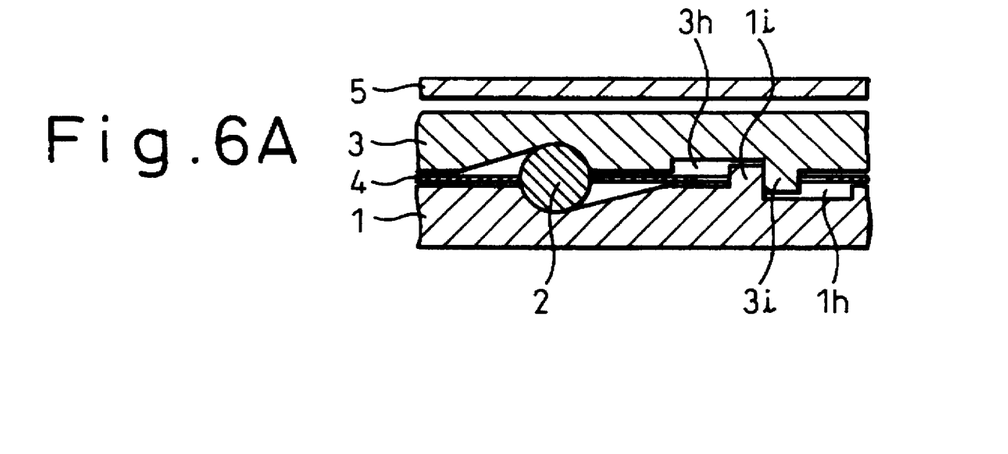
FIG. 6A to 6C are views for illustrating a structure and operation of the third embodiment.
Figure 6B:
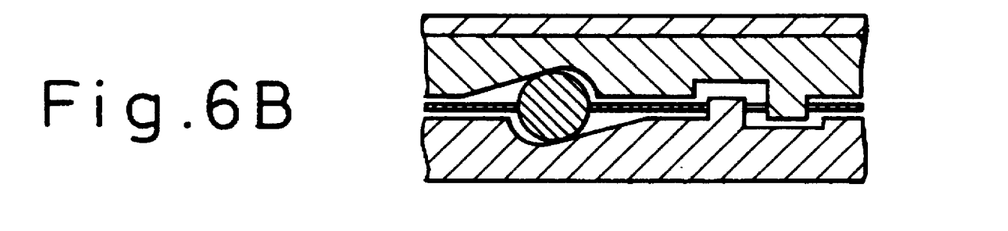
Figure 6C:
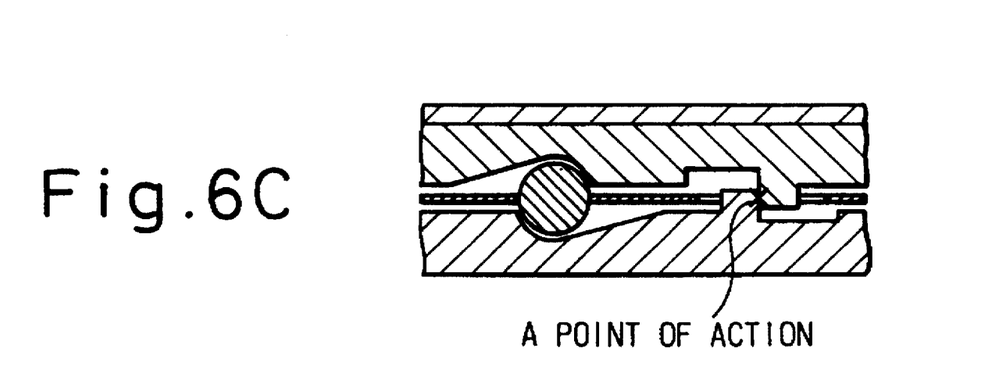

The third embodiment shown in FIGS. 6A to 6C is substantially identical to the first embodiment except that recesses 1h, 3h are provided in the piston 1 and the pressure plate 3, respectively, and a projection 1i, 3i are also provided in the piston 1 and the pressure plate 3. A description of the operation is not given because it is the same as the first embodiment.

The third embodiment has an advantage in that, since the depth of the respective recess can be smaller, the thickness of the recess-carrying member can be reduced.

Figure 7A:
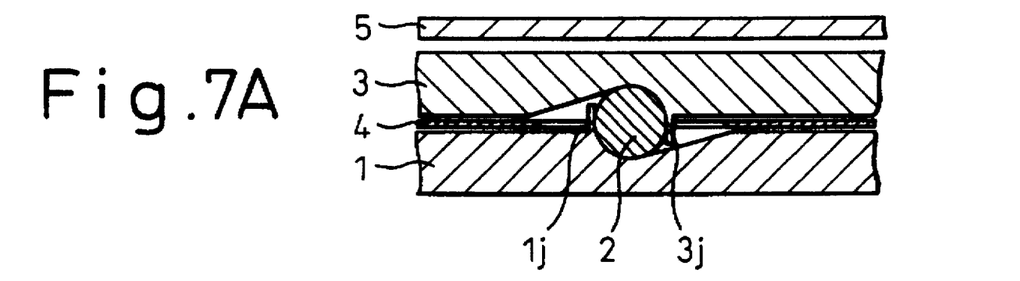
FIG. 7A to 7C are views for illustrating a structure and operation of the fourth embodiment.
Figure 7B:
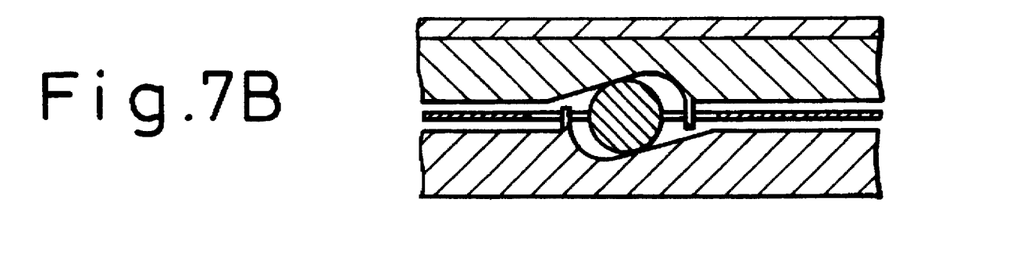
Figure 7C:
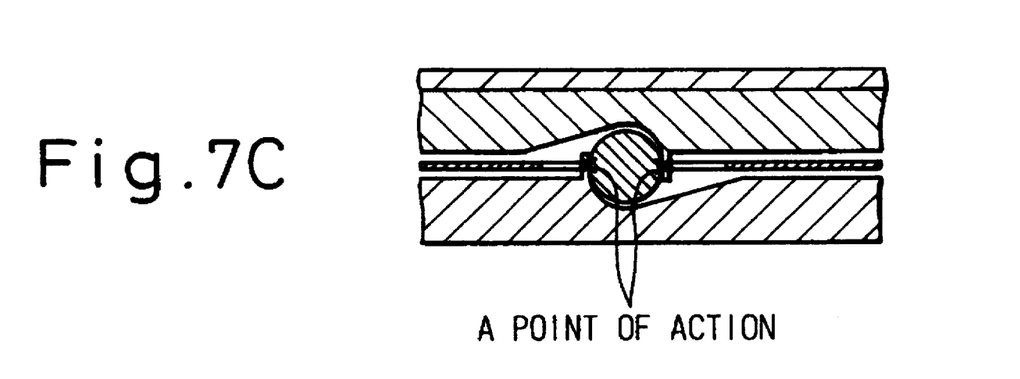

The fourth embodiment shown in FIGS. 7A to 7C has projections 1j, 3j on a non-slanted wall of the cam surface of the piston 1 and on a non-slanted wall of the cam surface of the pressure plate 3, respectively, for preventing the roller 2 from riding thereon. As shown in FIG. 7C, the projections 1j, 3j are designed to be sufficiently higher than the center of the roller so that the roller 2 does not ride on the piston 1 and the pressure plate 3 when the relative rotation occurs in the direction wherein the cam mechanism is inoperative.

Accordingly, also in the fourth embodiment, when the direction of the relative rotation between the piston 1 and the pressure plate 3 is changed from the operative phase to the inoperative phase of the cam mechanism, the unfavorable thrust can be reliably prevented from occurring.

Figure 8A:
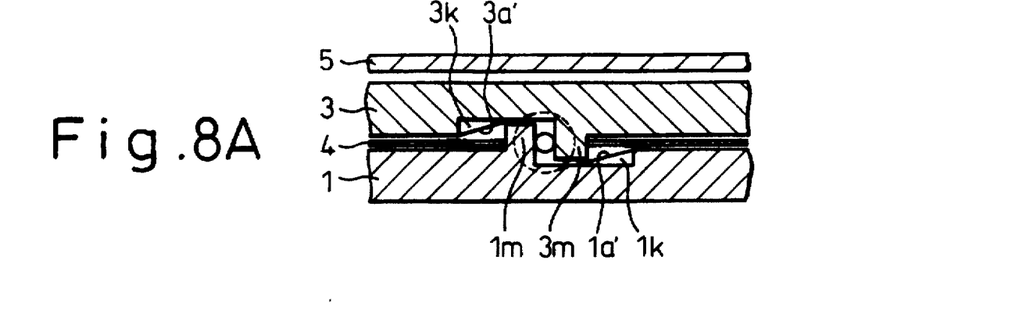
FIG. 8A to 8E are views for illustrating a structure and operation of the fifth embodiment.
Figure 8B:
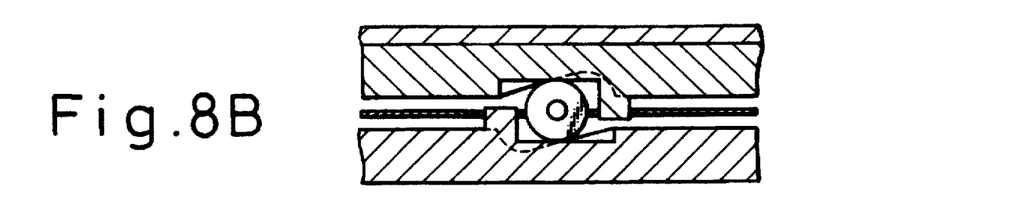
Figure 8C:
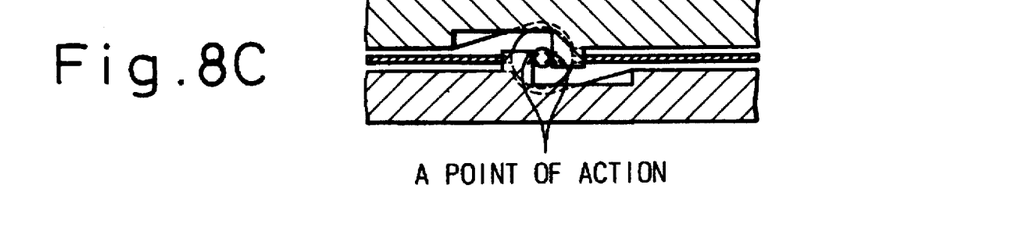
Figure 8D:
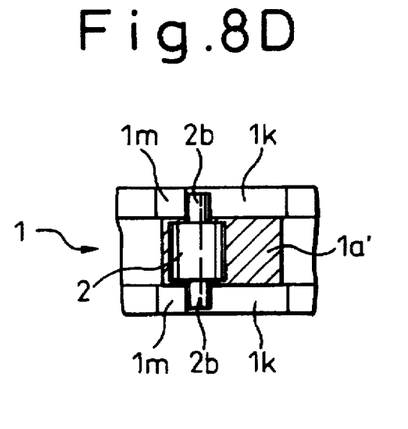
Figure 8E:
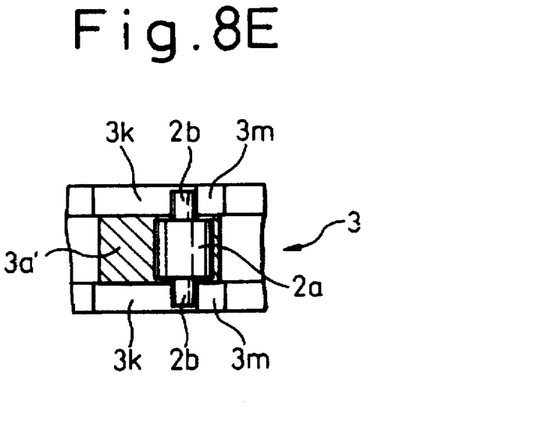

FIGS. 8A to 8E show the fifth embodiment wherein FIG. 8D illustrates the relationship between the roller 2 and the piston 1 as seen from the pressure plate 3, and FIG. 8E illustrates the relationship between the roller 2 and the piston 1 as seen from the piston 1.

As shown in FIGS. 8D and 8E, according to the fifth embodiment, the roller 2 is not uniform in diameter in the widthwise direction but is divided into a central larger diameter section 2a and a smaller diameter section 2b at each end.

In a central area of the piston 1 is formed a narrow cam surface 1a' wherein recesses 1k and projections 1m are provided in the side portions of the piston 1, and in a central area of the pressure plate 3 is formed a narrow cam surface 3a' wherein recesses 3k and projections 3m are provided in the side portions of the pressure plate 3, whereby the larger diameter section 2a can be solely in contact with the cam surface.

As shown in FIG. 8C, the projections 1m, 3m are designed to be higher than the center of the roller 2 so that the smaller diameter sections 2b of the roller 2 abut onto the projection 1m on the piston 1 and the projection 3m on the pressure plate 3 to inhibit the piston 1 and the pressure plate 3 from moving to the left and right in the figure and to prevent the roller 2 from riding on the cam.

Figure 9A:
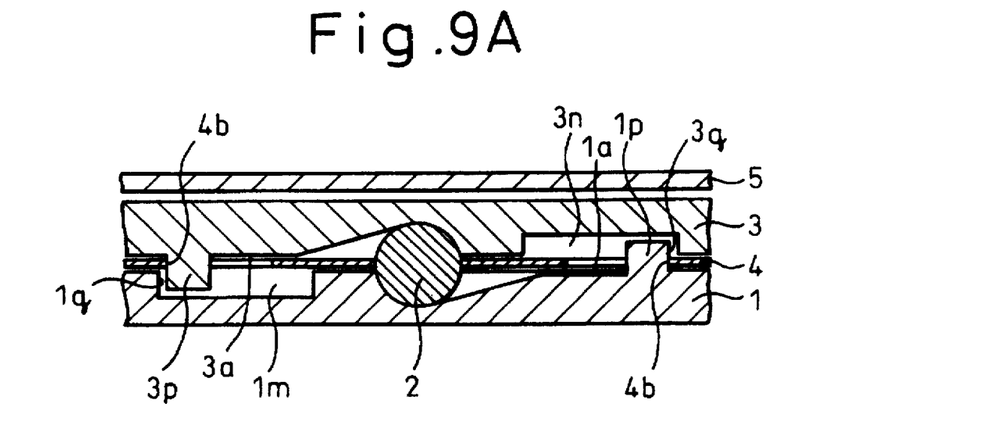
FIG. 9A to 9C are views for illustrating a structure and operation of the sixth embodiment.
Figure 9B:
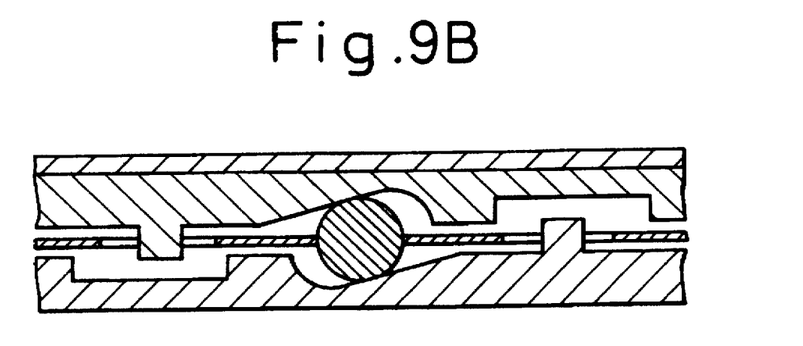
Figure 9C:
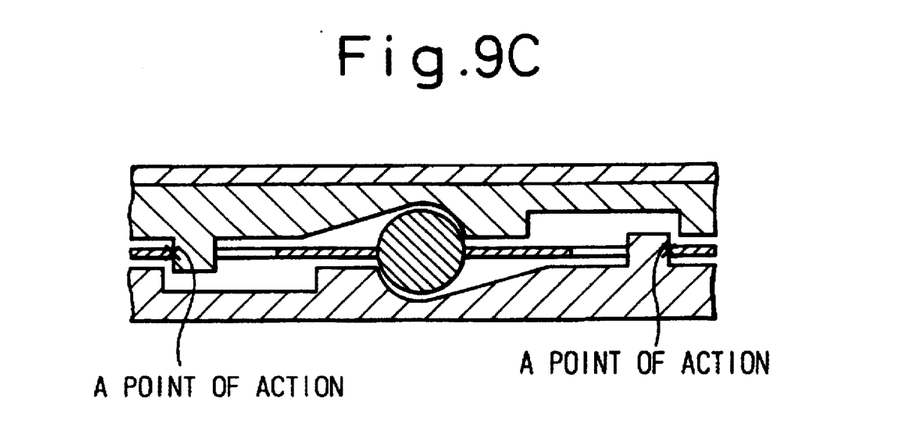

According to the sixth embodiment shown in FIGS. 9A to 9C, a recess 1n similar to that of the first embodiment is provided at a location further to the left from the cam surface 1a of the piston 1 and a projection 1p similar to that of the second embodiment is provided at a location further to the right from the cam surface 1a of the piston 1. On the other hand, a recess 3n similar to that of the first embodiment is provided at a location further to the right from the cam surface 3a of the pressure plate 3 and a projection 3p similar to that of the second embodiment is provided at a location further to the left from the cam surface 3a of the pressure plate 3. However, the limitation of the relative movement between the piston 1 and the pressure plate 3, when the relative rotation occurs in the direction wherein the cam mechanism is inoperative, does not rely on the abutting of these projections to these recesses, but on the abutting of the outer side walls 1g and 3g of the projections 1p and 3p to the opposite outer edges 4b of the roller cage 4.

Figure 10A:
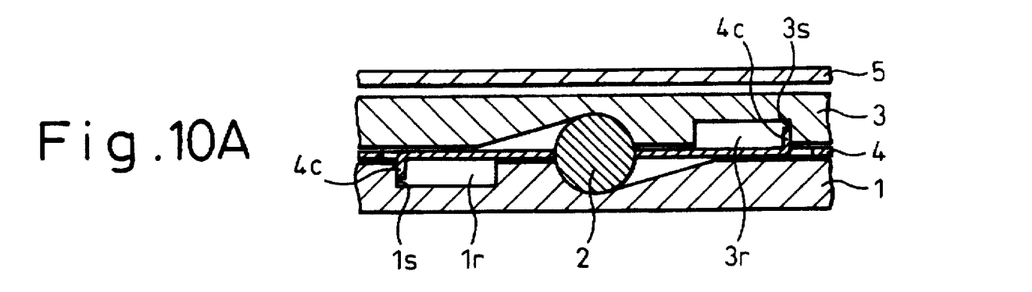
FIG. 10A to 10C are views for illustrating a structure and operation of the seventh embodiment.
Figure 10B:
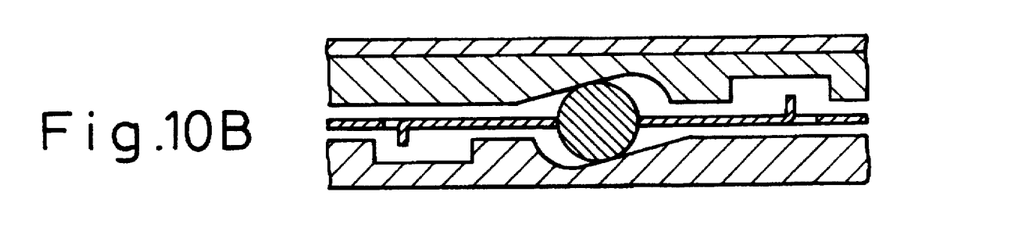
Figure 10C:
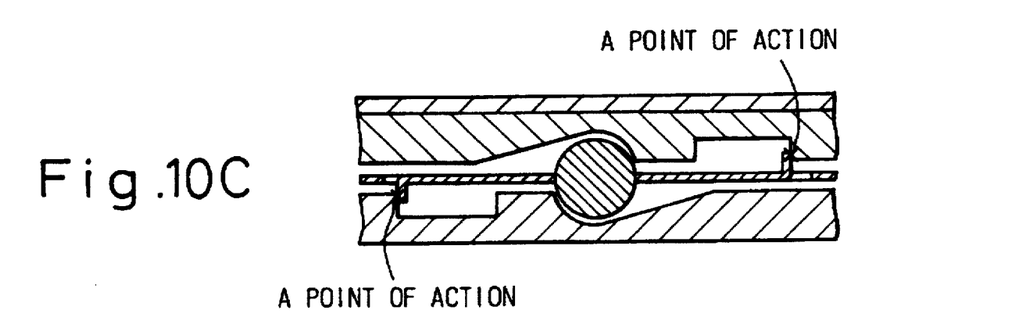

According to the seventh embodiment shown in FIGS. 10A to 10C, the piston 1 and the pressure plate 3 solely have recesses 1r, 3r, respectively, and a pair of fingers 4c are provided on the roller cage 4 by bending upright parts thereof.

When the relative rotation occurs in the direction wherein the cam mechanism is inoperative, the fingers 4c abut to the walls 1s, 3s of the recesses 1r, 3r, respectively, to limit the relative movement between the piston 1 and the pressure plate 3.

Since it is unnecessary to form projections on the piston 1 and the pressure plate 3, this embodiment is advantageous, compared to the sixth embodiment, in that the manufacturing cost is reduced.

Figure 11A:
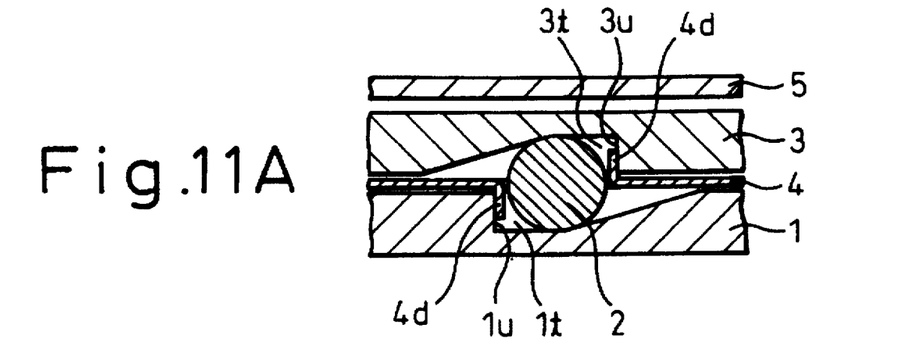
FIG. 11A to 11C are views for illustrating a structure and operation of the eighth embodiment.
Figure 11B:
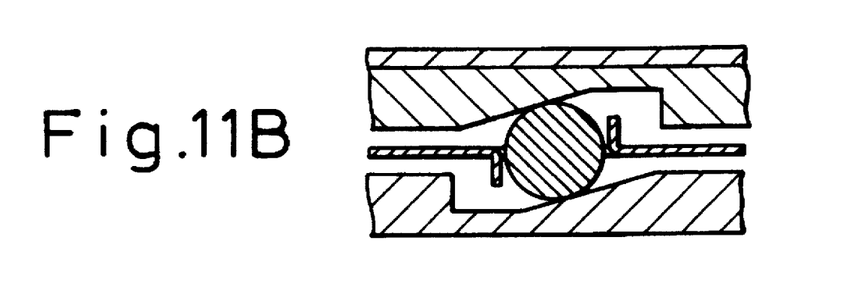
Figure 11C:
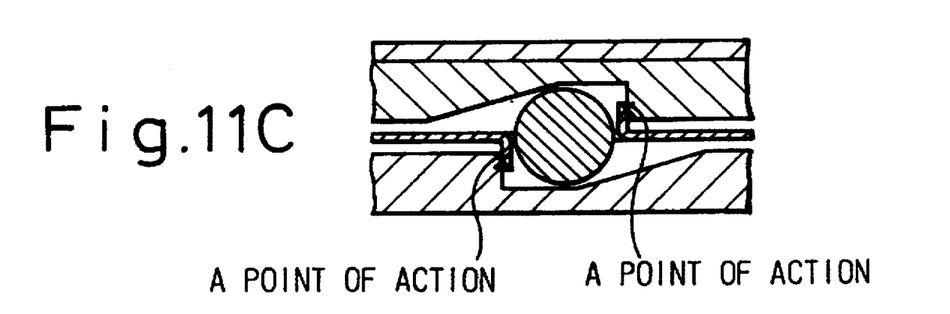

According to the eighth embodiment shown in FIGS. 11A to 11C, the piston 1 and the pressure plate 3 have recesses 1t, 3t, respectively, contiguous to the cam surfaces, while the roller cage 4 has a pair of fingers 4d formed by bending the roller cage upright at locations adjacent to the roller 2.

When the relative rotation occurs in the direction wherein the cam mechanism is inoperative, the fingers 4d abut to the inner side walls 1u, 3u of the recesses 1t, 3t to restrict the relative movement between the piston 1 and the pressure plate 3.

Since the recesses 1t, 3t are formed contiguously with the cam surfaces of the piston 1 and the pressure plate 3, respectively, this embodiment can be easily manufactured. Also, since elements are more collectively located in the vicinity of the roller 2 in comparison with the seventh embodiment, it is possible to dispose the device in a narrower space.

Figure 12A:
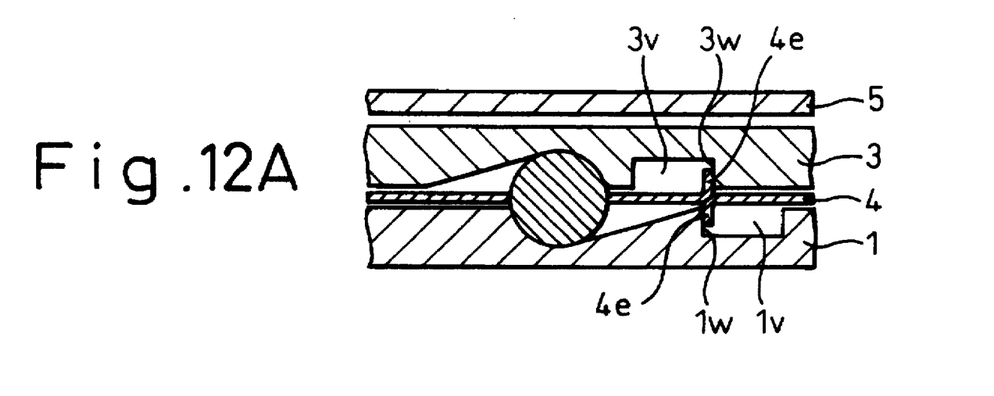
FIG. 12A to 12C are views for illustrating a structure and operation of the ninth embodiment.
Figure 12B:
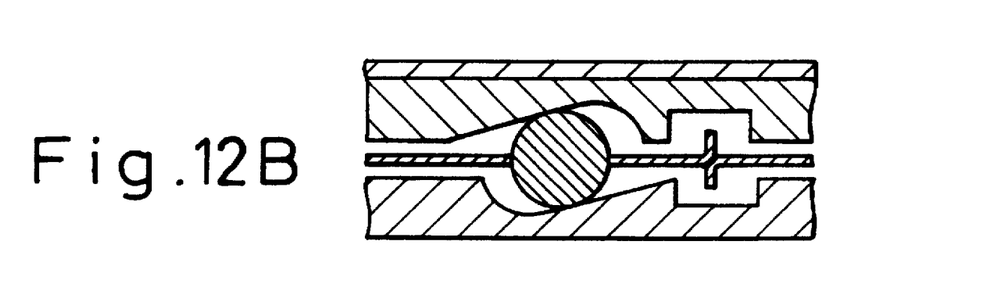
Figure 12C:
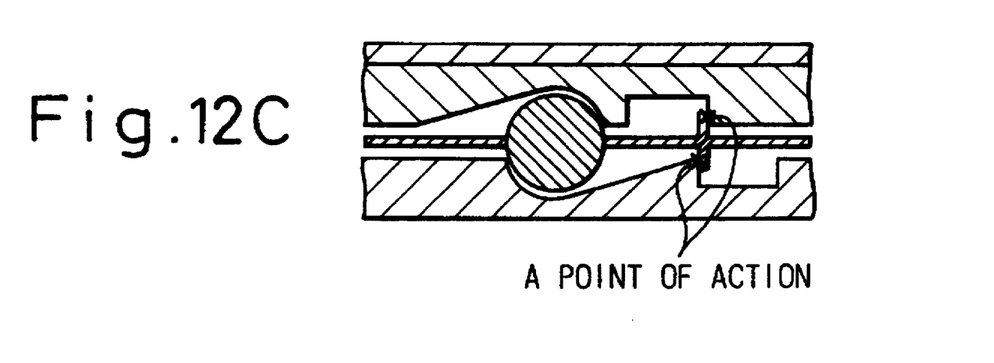

According to the ninth embodiment shown in FIGS. 12A to 12C, the piston 1 and the pressure plate 3 have recesses 1v, 3v, respectively, at locations further to the right from the roller. On the other hand, the roller cage 4 has a pair of fingers 4e provided at a single location while being projected toward the piston 1 and the pressure plate 3, respectively, which are capable of abutting to the inner side walls 1w, 3w of the recesses 1v, 3v, respectively, when the relative rotation occurs in the direction wherein the cam mechanism is inoperative.

Accordingly, this embodiment is advantageous in that the machining of the roller cage 4 becomes easier, in comparison with the eighth embodiment.

We claim:

1. A clutch device comprising:
   a pair of members disposed at a distance on a common axis and being relatively rotatable to each other on said common axis;
   a cam mechanism disposed between said pair of members, said cam mechanism comprising a pair of cam elements, each having a cam surface axially opposed to each other, and a cam roller disposed between said opposed cam surfaces;
   a pushing means for selectively pushing said cam mechanism as a whole onto the axially opposed surface of one of the relatively rotating members to convert a circumferential force to an axial thrust via said cam mechanism so that said relatively rotating members are integrally engaged with each other by said thrust; and
   a limiter means for limiting said relative rotational movement of said cam elements when said relative rotation occurs between said members in the direction reverse to that wherein said axial thrust is generated between the pair of members, wherein the limiter means stops further rotation of cam member which hold a cam roller therebetween before edges of the cam member contact the cam.

2. A clutch device as defined by claim 1, wherein said limiter means comprises a projection axially projected from one of said opposed surfaces of said cam elements and a recess provided on the other of said opposed surfaces of said cam elements.

3. A clutch device as defined by claim 2, wherein the recess is provided on the cam element closer to the piston and said projection is provided on the cam surface of the other cam element.

4. A clutch device as defined by claim 1, wherein the limiter means is a roller stopper for limiting the relative rotational movement of said pair of cam elements by restricting the movement of said cam roller.

5. A clutch device as defined by claim 4, wherein said roller stopper is of a type acting on a surface of said cam roller.

6. A crutch device as defined by claim 1, wherein said cam roller is rotatably held by a roller cage disposed between said cam members, and said limiter means is a roller cage stopper for limiting said relative rotational movement of said pair of cam elements by restricting a movement of said roller cage.

7. A clutch device as defined by claim 6, wherein said roller cage stopper comprises openings formed in said roller cage and projections formed on said cam elements.

8. A clutch device comprising:
   a pair of members disposed at a distance on a common axis and being relatively rotatable to each other on said common axis;
   a cam mechanism disposed between said pair of members, said cam mechanism comprising a pair of cam elements, each having a cam surface axially opposed to each other, and a cam roller disposed between said opposed cam surfaces;
   a pushing means for selectively pushing said cam mechanism as a whole onto the axially opposed surface of one of the relatively rotating members to convert a circumferential force to an axial thrust via said cam mechanism so that said relatively rotating members are integrally engaged with each other by said thrust; and a limiter means for limiting said relative rotational movement of said cam elements when said relative rotation occurs between said members in the direction reverse to that wherein said axial thrust is generated between the pair of members, wherein said limiter means comprises a projection axially projected from one of said opposed surfaces of said cam elements and a recess provided on the other of said opposed surfaces of said cam elements, and wherein said projection is provided on the cam surface of said cam element closer to the piston and said recess is provided on the cam surface of the other cam element.

9. A clutch device comprising:

a pair of members disposed at a distance on a common axis and being relatively rotatable to each other on said common axis;

a cam mechanism disposed between said pair of members, said cam mechanism comprising a pair of cam elements, each having a cam surface axially opposed to each other, and a cam roller disposed between said opposed cam surfaces;

a pushing means for selectively pushing said cam mechanism as a whole onto the axially opposed surface of one of the relatively rotating members to convert a circumferential force to an axial thrust via said cam mechanism so that said relatively rotating members are integrally engaged with each other by said thrust; and a limiter means for limiting said relative rotational movement of said cam elements when said relative rotation occurs between said members in the direction reverse to that wherein said axial thrust is generated between the pair of members, wherein the limiter means is a roller stopper for limiting the relative rotational movement of said pair of cam elements by restricting the movement of said cam roller, and wherein said roller stopper is of a type acting on a pair of end shafts of said cam roller.

10. A clutch device comprising:

a pair of members disposed at a distance on a common axis and being relatively rotatable to each other on said common axis;

a cam mechanism disposed between said pair of members, said cam mechanism comprising a pair of cam elements, each having a cam surface axially opposed to each other, and a cam roller disposed between said opposed cam surfaces;

a pushing means for selectively pushing said cam mechanism as a whole onto the axially opposed surface of one of the relatively rotating members to convert a circumferential force to an axial thrust via said cam mechanism so that said relatively rotating members are integrally engaged with each other by said thrust; and a limiter means for limiting said relative rotational movement of said cam elements when said relative rotation occurs between said members in the direction reverse to that wherein said axial thrust is generated between the pair of members, wherein said cam roller is rotatably held by a roller cage disposed between said cam members, and said limiter means is a roller cage stopper for limiting said rotational movement of said pair of cam elements by restricting movement of said roller cage, and wherein said roller cage stopper comprises projections formed in said roller cage and recesses formed on said cam elements.

11. A clutch device as defined by claim 10, wherein said recesses on said cam element are contiguous to said cam surface, and said projections on said roller cage are located in said vicinity of said roller.

12. A clutch device as defined by claim 10, wherein said projections on said cam member closer to said cam surface of said cam member closer to said piston and said cam surface of the other cam member from the same circumferential position.

* * * * *